(12) United States Patent
Lacombe et al.

(10) Patent No.: US 6,558,647 B2
(45) Date of Patent: May 6, 2003

(54) MICROPOROUS AND MESOPOROUS SILICOALUMINATE SOLID, PROCESS FOR PREPARATION, USE AS A CATALYST AND FOR HYDROCARBON CONVERSION

(75) Inventors: Sylvie Lacombe, Rueil Malmaison (FR); David Marseault, Villejuif (FR); Philippe Caullet, Illzach (FR); Henri Kessler, Wittenheim (FR); Eric Benazzi, Chatou (FR); Alexandre Jouve, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 306 days.

(21) Appl. No.: 09/736,048

(22) Filed: Dec. 14, 2000

(65) Prior Publication Data

US 2001/0031241 A1 Oct. 18, 2001

(30) Foreign Application Priority Data

Dec. 14, 1999 (FR) .............................. 99 15746

(51) Int. Cl.⁷ .............................. C01B 39/04
(52) U.S. Cl. ................ 423/702; 423/705; 423/706; 423/707; 423/DIG. 27; 502/64; 502/66; 502/68; 502/74; 208/46; 208/111.01; 208/111.3; 208/111.35; 208/120.01; 208/120.3; 208/120.35
(58) Field of Search .............................. 423/702, 705, 423/706, 707, DIG. 27, 718; 502/64, 66, 68, 74; 208/46, 111.01, 111.3, 111.35, 120.01, 120.3, 120.35

(56) References Cited

U.S. PATENT DOCUMENTS 5,849,258 A  * 12/1998  Lujano et al.

OTHER PUBLICATIONS

Kloestra et al., "Mesoporous material containing framework tectosilicate by pore–wall recrystallization," Chem. Commun., pp. 2281–2282.*

English Abstract of—XP–002146185, 1999.

English Abstract of —XP–002146186, 1998.

XP–002146183—Composites of micro– and mesoporous materials: simultaneous synthesis of MFI/MCM–41 like phases by a mixed template approach, Arne Karlsson et al., Microporous and Mesoporous Materials 27 (1999) 181–192.

XP–002146184—Characterization of nanocrystalline zeolite Beta, M.A. Camblor et al., Microporous and Mesoporous Materials 25 (1998) 59–74.

XP–000911747—Overgrowth of mesoporous MCM–41 on faujasite[1], K.R. Kloestra et al., Microporous Materials 6 (1996) 287–293.

* cited by examiner

Primary Examiner—David Sample
(74) Attorney, Agent, or Firm—Millen, White, Zelano & Branigan, P.C.

(57) ABSTRACT

The invention relates to an acidic silicoaluminate solid that has a microporous zeolitic phase that is characterized by at least one infrared band between 400–1600 cm-1, an organized mesoporosity that is characterized by the presence of at least one X-diffraction line between 20–100 Å, a silica/alumina molar ratio of between 5–250 and an acidity that is measured by infrared analysis via an area of the band at about 1545 cm-1 at least equal to 50 g of dry solid. The invention also relates to a process for the preparation of the solid, a substrate that consists of solid and at least one matrix, and a catalyst that comprises said solid. The catalyst can be used for the conversion of hydrocarbons and in particular hydrocracking.

18 Claims, No Drawings

MICROPOROUS AND MESOPOROUS SILICOALUMINATE SOLID, PROCESS FOR PREPARATION, USE AS A CATALYST AND FOR HYDROCARBON CONVERSION

This invention relates to an acidic solid that contains organized micropores and mesopores, a process for preparation and its use for the conversion of hydrocarbon feedstocks and in particular hydrocracking.

In the field of refining and petrochemistry, and in particular hydrocracking, two main types of materials constitute the acidic active phase of the catalysts, on the one hand the silica-aluminas, on the other hand the zeolites. The silica-aluminas generally have diameters with pores of between 4 and 50 nm and $SiO_2$ contents of between 1 and 90% by weight. One of their main defects resides in the fact that they have a very low acidity. Conversely, the zeolites and more particularly the aluminosilicate-type molecular sieves have an acidity that is 1,000 to 10,000 times more significant than the standard silica-aluminas. The zeolites, however, are microporous solids with pore openings that do not exceed 0.8 nm, which can constitute a handicap when it is desired to treat the feedstocks that comprise relatively voluminous molecules. As a result, when the zeolite is used in hydrocracking, it should first be dealuminified, which imparts to it both a suitable acidity and the mesoporosity that facilitates the diffusion of voluminous molecules.

The works achieved to date for obtaining microporous solids with a larger pore opening led to, for example, the synthesis of $AlPO_4$-8 (0.79×0.87 nm) in 1990, VPI-5 in 1988 (1.21 nm) and cloverite (1.32 nm) in 1991. To date, it was still possible to prepare these molecular sieves only in the Al-P or Ga-P systems for the cloverite, which does not impart acidity to them.

More recently, several types of solids with organized mesoporosity were described, the first in 1992 by Mobil (MCM-41). The MCM-41-type solids have a uniform and periodic mesoporous system with a diameter of between 1.5 and 10 nm.

Recent works had as a goal obtaining by synthesis a solid that comprises a microporous phase and a mesoporous phase. Lujano et al. (EP 0811423, 1997) describes obtaining a solid with microporous crystalline walls that are accessible via mesoporous channels. The X-ray diffraction spectrum that is obtained in these materials corresponds to that of the X zeolite. It does not show organized mesoporosity.

The research efforts of the applicant focused on the preparation of organized solids that have pores of a size greater than 0.8 nm, with a narrow pore size distribution and an acidity that can be adjusted.

The works of the applicant made it possible to achieve the preparation of silicoaluminate solids that comprise a well-organized mesoporosity, mean diameters of mesopores of between 2 and 20 nm, a zeolitic microporous phase and an acidity that is higher than those of silica-aluminas or standard mesoporous compounds and closer to that of zeolites, and that lead in hydrocarbon conversion to mean conversions that are close to those observed in zeolites, and therefore much higher than those observed in silica-aluminas or in standard mesoporous compounds.

This invention therefore makes it possible to avoid the drawbacks of standard silica-aluminas, namely their low acidity and their low activity, as well as the drawbacks of zeolites that do not make it possible to convert voluminous molecules because of their pore sizes that are limited to several nm.

More specifically, the invention relates to a solid that comprises organized micropores and mesopores and that has:

- an $SiO_2/Al_2O_3$ molar ratio of between 5–250
- by X-diffraction at least one line at an interrecticular distance of between 20–200 Å that represents an organized mesoporosity
- by infrared spectroscopy at least one band between 400–1600 cm$^{-1}$ that is characteristic of the Si—O framework bonds of a zeolitic microporous phase
- by infrared analysis, after high-temperature vacuum treatment then pyridine chemisorption to saturation, the area of the band at about 1545 cm$^{-1}$, representative of the acidity, is at least equal to 50 per 1 g of dry solid (expressed by absorbance unit×wave number).

The solid according to the invention has as its characteristics:

- the silica/alumina ($SiO_2/Al_2O_3$) molar ratio is between 5 and 250, preferably between 10 and 200, even more preferably between 10 and 100,
- the X-ray diffraction spectrum has at least one line at an interrecticular distance of between 20 and 100 Å, preferably at least one line around 40±5 Å, representative of an organized mesoporous solid,
- the X-ray diffraction spectrum has lines that are characteristic of a microporous zeolitic compound,
- said solid preferably has a mesoporous volume that is determined by the BJH method (ASTM Standard D4641-93) that is at least equal to 0.13 cm$^3$/g, preferably with a mesopore size distribution that is centered at a value of between 1.5 and 10 nm, preferably between 2 and 4 nm, such that the width at mid-height is less than 2 nm, preferably less than 1 nm,
- said solid preferably has a microporous volume that is determined by the t-plot method (ASTM Standard D4365-85) of between 0.01 and 0.18 cm$^3$/g, preferably between 0.01 and 0.15 cm$^3$/g
- by infrared spectroscopy, said solid has at least one band (in general several) in the wavelength domain of between 400 and 1600 cm$^{-1}$ characteristic of Si—O framework bonds of a zeolitic phase,
- the acidity is such that by infrared analysis, after high-temperature vacuum treatment then pyridine chemisorption to saturation, the area of the band that corresponds to the wave number at 1545 cm$^{-1}$ and attributed to the pyridinium ion, therefore to the Brönsted acidity, expressed by absorbance unit multiplied by a wave number (in cm$^{-1}$) and measured relative to the tangent to the peak, is at least equal to 50 per 1 g of dry solid, preferably at least equal to 80 per 1 g of dry solid.

This invention also relates to a process for preparation of said solid and its use for hydrocarbon conversion.

More specifically, the preparation process comprises:

(a) mixing in aqueous solution of at least one aluminum source, at least one silicon source and at least one structuring agent R of the zeolitic phase, whereby said mixture has the composition (in mol/mol):

$$Al/Si = 0.005–0.6$$

$$R/Si = 0.1–1.5$$

$$H_2O/Si = 10–100$$

(b) autoclaving of the homogenized mixture at 80–200° C. for 1 hour to 5 days to obtain a crystal suspension whose size remains smaller than 300 nm
(c) at least one surfactant S is added to said cooled suspension that is optionally diluted with water and at least one aluminum source and/or at least one silicon source to obtain at pH=8–12 the composition (in mol/mol):

$$Al/Si = 0.005-1$$
$$R/Si = 0.1-1.5$$
$$S/Si = 0.1-1$$
$$H_2O/S = 100-1000$$
$$H_2O/Si = 20-200$$
$$OH^-/Si = 0.1-0.4$$

(d) autoclaving at 20–160° C. for 15 minutes to 5 days (e) the autoclaved solid is cooled, washed, and calcined.

The preparation of the aluminosilicate according to the invention preferably comprises the following stages:

A first reaction mixture is formed in aqueous solution that comprises in particular water, at least one source of the element aluminum, at least one source of the element silicon, and at least one source of an organic or mineral compound that acts as a structuring agent of the zeolitic phase and denoted R. Said mixture has a composition in terms of molar ratio that is included in the intervals of the following values:

| Al/Si | 0.005–0.6, preferably 0.01–0.1 |
| R/Si | 0.1–1.5, preferably 0.2 to 1 |
| $H_2O$/Si | 10–100, preferably 10–50. |

The mixture is stirred at ambient temperature until homogenization takes place, for example, for one hour, then transferred into an autoclave that is coated with polytetrafluoroethylene and placed in a drying oven that is kept at a temperature of between 80 and 200° C. for a period that can vary from 1 hour to 5 days under static conditions or while being stirred. The autoclaving period is selected such that a sampling of the centrifuged mixture that is then washed, for example by redispersion in water and centrifuging, consists of crystals whose size is less than 300 nm, preferably less than 150 nm, still more preferably less than 90 nm.

The autoclave is then cooled to ambient temperature.

A second reaction mixture in aqueous solution that comprises in particular water, at least one source of the element aluminum and/or at least one source of the element silicon is optionally added to the suspension that is obtained during the preceding stage.

The suspension that is obtained during the preceding stage is mixed with at least one surfactant (or with a solution that contains at least one surfactant), whereby all of the surfactants are denoted S. The mixture is stirred vigorously at ambient temperature preferably for a period that is at least equal to or greater than 15 minutes, then it is brought to a pH of between 8 and 12 with an aqueous solution of an acid A. The fluid gel that is obtained has a composition in terms of molar ratio that is in the ranges of the following values:

| Al/Si | 0.005–1 |
| R/Si | 0.1–1.5, preferably 0.2 to 1 |
| S/Si | 0.1–1, preferably 0.2–0.5 |
| $H_2O$/S | 100–1000 |
| $H_2O$/Si | 20–200, preferably 40–120 |
| $OH^-$/Si | 0.1–0.4 |

The mixture is transferred into an autoclave that is coated with polytetrafluoroethylene and placed in a drying oven that is kept at a temperature of between ambient temperature 20° C. and 160° C., preferably 140° C., for a period that can vary from 15 minutes to 5 days, under static conditions, preferably during a period that is greater than three days. The autoclave is then cooled to ambient temperature.

The solid is recovered by centrifuging or filtration, washed, preferably with warm water, dried, preferably in the drying oven at 60° C., then calcined, preferably in air, at a temperature that is high enough to eliminate by combustion the entire organic compound. A preferred calcination method is a calcination in air at 550° C. for 6 hours.

The silicon source may be one of those that is commonly used in the synthesis of zeolites, for example of the powdered solid silica, silicic acid, colloidal silica or dissolved silica. Among the powdered silicas, it is possible to use precipitated silicas, in particular those that are obtained by precipitation from an alkaline metal silicate solution, such as the one that is called "KS 300" that is produced by AKZO, and similar products, Aerosil silicas (Degussa), pyrogenous silicas, for example "CAB-O-SIL" and silica gels in contents suitable for being used in reinforcement pigments that are intended for rubber and for silicone rubber. It is possible to use colloidal silicas that have various particle sizes, for example with a mean equivalent diameter of between 10 and 15 $\mu$m or between 40 and 50 $\mu$m such as the ones that are marketed under the registered trademarks "LUDOX," NALCOAG," and "SYTON." The dissolved silicas that can be used also comprise soluble glass silicates that are commercially available and that contain 0.5 to 6.0, in particular 2.0 to 4.0 mol of $SiO_2$ per mol of alkaline metal oxide, "active" alkaline metal silicates as defined in British Patent GB-A-1,193,254 and silicates that are obtained by dissolution of silica in an alkaline metal hydroxide or a quaternary ammonium hydroxide, or else a mixture of the latter. It is also possible to use silicic esters that can be hydrolyzed.

The pyrogenous silicas, the Aerosil silicas, will preferably be used as a silica source.

The aluminum source is selected from among metal aluminum, sodium aluminate or an aluminum salt, for example, chloride, nitrate or sulfate, an aluminum alkoxide or alumina itself, preferably in hydrated or hydratable form, such as, for example, colloidal alumina, pseudoboehmite, gamma-alumina or alpha- or beta-trihydrate. It is also possible to use mixtures of the sources that are cited above.

Some or all of the alumina and silica sources optionally can be added in aluminosilicate form.

The various organic agents that can be used during the formation of the first reaction mixture are agents that are used to carry out the synthesis of various molecular sieves known to date. It will be possible to cite as usable organic agents and by way of nonlimiting examples tetraalkylammonium hydroxides (whereby the alkyl group is preferably a methyl, ethyl, propyl or butyl group), quinuclidine, cyclic amine salts, cyclic and aliphatic amines, and alcohols. The organic structuring agent preferably is the tetraethylammonium hydroxide (TEAOH) that leads specifically to the synthesis of the beta zeolite.

Among the surfactants that constitute the S group, it is possible to cite the alkyltrimethylammonium hydroxide or halide, the fatty amines, and the surfactants that contain an ethylene polyoxide chain. Cetyltrimethylammonium bromide will preferably be used.

Among the acids that can be used in the second stage of the preparation according to the invention for adjusting (if necessary) the pH to a value of between 8 and 12, it is possible to cite, by way of nonlimiting example, hydrochloric acid, hydrofluoric acid, sulfuric acid, nitric acid, as well as the soluble organic acids, for example the formic, acetic, propionic, and butyric acids.

The silicoaluminate solid according to the invention is catalytically active to carry out the conversion of hydrocarbon petroleum feedstocks, more specifically for carrying out hydrocracking. Said solid is also more particularly suited for conversion of heavy molecules.

The silicoaluminate solid according to the invention can be used as is or mixed and shaped with at least one binder or a matrix that is usually amorphous or poorly crystallized that is selected from, for example, the group that is formed by alumina, silica, magnesia, titanium oxide, zirconia, aluminum phosphates, titanium phosphates or zirconium phosphates, clays, boron oxides and combinations of at least two of these compounds. The mixture that is obtained is called a substrate.

The matrix is preferably selected from the group that is formed by silica, alumina, magnesia, silica-alumina combinations and silica-magnesia combinations.

The substrate according to the invention can be shaped by all of the methods that are well known to one skilled in the art. Advantageously, it can be shaped by extrusion, by drying by atomization or by any other technique that is known to one skilled in the art. The shaping is followed by a calcination.

The invention therefore also relates to the composition (the substrate) that is described above and the composition (the catalyst) that contains said substrate and at least one catalytic element. It is also possible that the substrate can play the role of catalyst, i.e., in the absence of a catalytic element.

In the case where the application in question requires the presence of a hydro-dehydrogenating function, such as in particular hydrocracking, the hydro-dehydrogenating element can be introduced into the substrate at various levels of the preparation and in various ways. The hydro-dehydrogenating element is selected from the group that is formed by the non-noble metals of group VIII and the metals of group VIB.

In the case of hydrocracking, the hydro-dehydrogenating function is generally ensured by at least one metal or metal compound of group VIII that is non-noble, such as nickel and cobalt in particular. It is possible to use a combination of at least one metal or metal compound of group VIB (in particular molybdenum or tungsten) and at least one metal or metal compound of group VIII that is non-noble (in particular cobalt or nickel) of the periodic table. The total concentration of oxides of metals of groups VIB and/or VIII that are non-noble is between 1 and 40% by weight and preferably between 3 and 40%, advantageously between 8 and 40%, and even 10 to 40% and, better, 10–30% by weight, and the ratio by weight that is expressed in metallic oxide of metal (or metals) of group VIB to non-noble metal (or metals) of group VIII is between 1.25 and 20 and preferably between 2 and 10. In addition, this catalyst can contain phosphorus. The phosphorus content, expressed by concentration of phosphorus oxide $P_2O_5$, will be less than 15% by weight and preferably less than 10% by weight.

Preferably, in the case where a combination of the metals of groups GVIII that are non-noble and VIB is used, the catalyst undergoes a sulfurization stage prior to use in hydrocracking.

In the case of their use in hydrocracking, the catalysts that are thus obtained exhibit, relative to the zeolitic catalysts of the prior art, an improved selectivity for the production of middle distillates of very good quality.

The feedstocks that are used in the hydrocracking process are, for example, gas-oils, vacuum gas-oils, deasphalted residues or hydrotreated residues or the equivalent. This can be heavy fractions that consist of at least 80% by volume of compounds whose boiling points are higher than 350° C. and preferably less than 580° C. They generally contain heteroatoms such as sulfur and nitrogen. The nitrogen content is usually between 1 and 5,000 ppm by weight and the sulfur content is between 0.01 and 5% by weight. The hydrocracking conditions such as temperature, pressure, hydrogen recycling rate, and hourly volumetric flow rate, can be very variable based on the nature of the feedstock, the quality of the desired products, and installations that the refiner uses.

The temperatures are generally higher than 230° C. and often between 300° C. and 480° C., preferably less than 450° C. The pressure is greater than or equal to 2 MPa and in general greater than 3 MPa, and even 10 MPa. The hydrogen recycling rate is at least 100 and often between 260 and 3,000 liters of hydrogen per liter of feedstock. The hourly volumetric flow rate is generally between 0.2 and 10 $h^{-1}$.

The following examples illustrate this invention without, however, limiting its scope.

EXAMPLE 1

Preparation

Solution (1): 0.064 g of metal aluminum is dissolved in 5.283 g of aqueous solution of TEAOH 35%.

Solution (2): 3.533 g of Aerosil 200 is dissolved in 8.567 g of TEAOH 35% that is diluted with 6.883 g of distilled water.

The dissolution is done in a water bath at 40–60° C. for several hours. Once the two solutions are clear, solution (1) is added to solution (2) while being stirred. The mixture that is obtained, with molar composition:

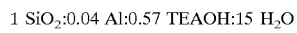

1 $SiO_2$:0.04 Al:0.57 TEAOH:15 $H_2O$ is stirred for one hour at ambient temperature so as to be quite homogenous. It is then transferred into a PTFE-coated autoclave that is placed in a drying oven that is kept at 140° C. for 3 days under static conditions. The autoclave is then cooled to ambient temperature. At this stage, a sampling (P) makes it possible to ensure the quality of the intermediate product that is obtained. Sampling (P) is centrifuged at 15,000 rpm for 1 hour. The product that is obtained is washed by redispersion in the water and centrifuging. The solid that is obtained by sampling is a completely crystallized β zeolite; the crystals have a size of 50–70 nm and the Si/Al molar ratio of the zeolite that is determined by X fluorescence is 16.2.

Solution (3): 4.31 g of $C_{16}$TMABr is dissolved in 51.38 g of distilled water (in a water bath at 40° C. for several minutes).

The suspension that is obtained by autoclaving is added to solution (3) while being stirred vigorously. The mixture is stirred for 20 minutes at ambient temperature, then it is acidified at pH=10, still while being stirred vigorously, with 3.00 g of an aqueous HCl solution at 18.16%. The fluid gel that is obtained has the following molar composition:

1 $SiO_2$:0.04 Al:0.57 TEAOH:0.20 $C_{16}$TMABr:0.257 HCl:66 $H_2O$.

The mixture is transferred into a PTFE-coated autoclave then heated to 140° C. for 3 days.

The autoclave is then cooled. The solid is recovered by centrifuging or filtration, washed with hot water (60° C.), dried in a drying oven at 60° C., then calcined at 550° C. for 6 hours in air.

Characteristics

The DRX of the solid has characteristic peaks that are attributed to the β zeolite and to MCM-41 (FIG. 1 and Table 1). The infrared spectrum also has two bands with 520 and 560 $cm^{-1}$ that are characteristic of the β zeolite.

TABLE 1

Values of the signals of DRX of Example 1

| d (Å) | I/Imax (%) | d (Å) | I/Imax (%) | d (Å) | I/Imax (%) | d (Å) | I/Imax (%) |
|---|---|---|---|---|---|---|---|
| 39.94 | 100 | 6.52 | 3 | 3.47 | 3 | 2.89 | 1 |
| 22.38 | 11 | 5.91 | 18 | 3.27 | 4 | 2.67 | 2 |
| 11.29 | 32 | 4.11 | 10 | 3.08 | 4 | 2.45 | 2 |
|  |  | 3.92 | 41 | 3.00 | 4 | 2.06 | 2 |

The nitrogen adsorption isotherm (FIG. 2) shows the presence of a characteristic working of a mesoporosity. The inflection point is located toward p/p°=0.30–0.35.

The microporous volume, determined by t-plot (ASTM Standard D 4365-85), is $V_{micro}$=0.17 $cm^3 \cdot g^{-1}$ (FIG. 3).

The product has a very narrow pore size distribution in the mesoporous range. The application of the BJH method (ASTM Standard D 4641-93) shows a pore diameter of 34 Å (width at mid-height=4 Å), corresponding to a mesoporous volume of 0.14 $cm^3 \cdot g^{-1}$ (FIG. 4).

The Si/Al molar ratio of the β zeolite is 16.2. The Si/Al molar ratio of the mesoporous portion is 52.6. The overall molar ratio of the solid is 23.9.

The acidity is characterized by infrared analysis, after intense vacuum treatment (around $10^{-6}$ mbar) at 350° C. for 10 hours, pyridine adsorption for 10 seconds at 25° C., desorption for 2 hours at 25° C., then desorption for 1 hour at 150° C., still under intense vacuum (around $10^6$ mbar). The air of the peak that corresponds to the wave number around 1545 $cm^{-1}$, attributed to the pyridinium ion, therefore to the Brönsted acidity, expressed by absorbance unit multiplied by a wave number (in $cm^{-1}$) and measured relative to the tangent to the peak, is equal to 106±10 per 1 g of dry solid.

After 0.5% by weight of Pt is deposited by dry impregnation by using as a precursor an aqueous solution of the compound Pt$(NH_3)_4Cl_2$, followed by a calcination at 450° C. in dry air and a reduction to 450° C. under pure hydrogen atmosphere, the catalyst converts 85% by weight of the feedstock that consists of n-heptane under the following operating conditions:

T reaction=230° C., H2/n-decane molar ratio=2, total pressure of 1 bar, and a pph=1, i.e., a flow rate of n-decane of 1 gram per gram of active phase and per hour.

EXAMPLE 2

Preparation

Solution (1): 0.077 g of metal aluminum is dissolved in 6.31 g of aqueous solution of TEAOH 35%.

Solution (2): 4.34 g of Aerosil 200 is dissolved in 11.28 g of TEAOH 35% that is diluted with 8.97 g of distilled water.

The dissolution is done in a water bath at 40–60° C. for several hours. Once the two solutions are clear, solution (1) is added to solution (2), while being stirred. The mixture that is obtained, with molar composition:

1 $SiO_2$:0.04 Al:0.59 TEAOH:15 $H_2O$ is stirred for one hour at ambient temperature before becoming quite homogeneous. It is then transferred into a PTFE-coated autoclave, which is placed in a drying oven that is kept at 140° C. for 3 days under static conditions. The autoclave is then cooled to ambient temperature. At this stage, a sampling (P) makes it possible to ensure the quality of the intermediate product that is obtained. Sampling (P) is centrifuged at 15,000 rpm for 1 hour. The product that is obtained is washed by redispersion in the water and centrifuging. The solid that is obtained by sampling is a completely crystallized β zeolite: the crystals are 50–70 nm in size, and the Si/Al molar ratio of the zeolite that is determined by X fluorescence is 16.5.

Solution (3): 0.049 g of metal aluminum is dissolved in 3.01 g of aqueous solution of TEAOH 35%.

Solution (4): 2.60 g of Aerosil 200 is dissolved in 7.65 g of TEAOH 35% that is diluted with 13.8 g of distilled water.

The dissolution is done in a water bath at 40–60° C. for several hours. Once the solutions are clear, solution (3) is added to solution (4), while being stirred.

Solution (5): 5.28 g of $C_{16}$TMABr is dissolved in 18.63 g of distilled water (in a water bath at 40° C. for several minutes).

32.85 g of water as well as the contents of the autoclave are added to the mixture of ((3)+(4)). Stirring of the suspension is allowed to continue for 15 minutes, then solution (5) is added: a precipitate (flocculate) appears. The mixture is stirred for 20 minutes at ambient temperature, then it is acidified at pH=10, always while being stirred vigorously, with 7.82 g of an aqueous HCl solution at 18.16%. The fluid gel that is obtained has the following molar composition:

1 $SiO_2$:0.04 Al:0.59 TEAOH:0.125 $C_{16}$TMABr:0.34 HCl:47.5 $H_2O$.

The mixture is transferred into a PTFE-coated autoclave and then heated to 140° C. for 3 days.

The autoclave is then cooled. The solid is recovered by centrifuging or filtration, washed with warm water (60° C.), dried in a drying oven at 60° C., then calcined at 550° C. for 6 hours in air.

Characteristics

The DRX of the solid that is obtained (FIG. 2) has the characteristics of the MCM-41 and the β zeolite. The infrared spectrum also has two bands with 520 and 560 $cm^{-1}$ that are characteristic of the β zeolite.

The nitrogen adsorption isotherm (FIG. 5) shows the presence of a characteristic working of a mesoporosity. The inflection point is located at p/p°=0.32.

The microporous volume, determined by t-plot (ASTM Standard D 4365-85) is $V_{micro}$=0.12 $cm^3 \cdot g$ (FIG. 6).

The product presents a very narrow pore size distribution in the mesoporous range (FIG. 7). The application of the BJH method (ASTM Standard D 4641-93) reveals a pore diameter of 23 Å (width at mid-height=4 Å), corresponding to a mesoporous volume of 0.18 $cm^3 \cdot g^{-1}$.

The acidity is characterized by infrared analysis, after intense vacuum treatment (around $10^{-6}$ mbar) at 350° C. for 10 hours, pyridine adsorption for 10 seconds at 25° C., desorption for 2 hours at 25° C. then desorption for 1 hour at 150° C., always under intense vacuum (around $10^{-6}$ mbar). The air of the peak that corresponds to the wave number around 1545 cm$^{-1}$, attributed to the pyridinium ion, therefore at the Brönsted acidity, expressed by absorbance unit multiplied by a wave number (in cm$^{-1}$) and measured relative to the tangent to the peak, is equal to 125±10 per 1 g of dry solid.

After 0.5% by weight of Pt is deposited by dry impregnation by using as a precursor the compound Pt(NH$_3$)$_4$Cl$_2$, followed by a calcination at 450° C. in dry air and a reduction at 450° C. under pure hydrogen atmosphere, the catalyst converts 88% by weight of the feedstock that consists of n-heptane under the following operating conditions:

T reaction=230° C., h2/n-decane molar ratio=2, total pressure of 1 bar, and a pph=1, i.e., an n-decane flow rate of 1 gram per gram of active phase and per hour.

What is claimed is:

1. A solid comprising organized micropores and mesopores and:

an SiO$_2$/Al$_2$O$_3$ molar ratio of between 5–250, by x-ray diffraction at least one line at an interrecticular distance of between 20–200 Å that represents an organized mesoporosity, by infrared spectroscopy at least one band between 400–1600 cm$^{-1}$ that is characteristic of the Si—O framework bonds of a zeolitic microporous phase, and by infrared analysis, after high-temperature vacuum treatment then pyridine chemisorption to saturation, an area of the band at about 1545 cm$^{-1}$, representative of acidity, of at least equal to 50 per 1 g of dry solid (expressed by absorbance unit x wave number).

2. A solid according to claim 1, further comprising:

a mesoporous volume at least equal to 0.13 cm$^3$/g, and a microporous volume between 0.01 and 0.18 cm$^3$/g.

3. A solid according to claim 1, having a mesopore size distribution centered at a value of between 1.5 and 10 nm.

4. A solid according to claim 1, having by x-ray diffraction, a line at 40±5 Å.

5. A solid according to claim 1, having x-ray diffraction lines of beta zeolite and MCM-41.

6. A process for the preparation of a solid according to claim 1, comprising the following successive stages:

(f) mixing an aqueous solution of at least one aluminum source, at least one silicon source and at least one structuring agent R of the zeolitic phase to obtain a homogenous mixture of, the composition (in mol/mol):

$$Al/Si = 0.005–0.6$$
$$R/Si = 0.1–1.5$$
$$H_2O/Si = 10–100$$

(g) autoclaving of the homogenized mixture at 80–200° C. for 1 hour to 5 hours to obtain a crystal suspension whose crystal size remains smaller than 300 nm, and cooling the resultant autoclaved mixture (h) adding at least one surfactant S to the resultant cooled suspension said surfactant being optionally diluted with water and at least one aluminum source and/or at least one silicon source to obtain at pH=8–12 the composition (in mol/mol):

$$Al/Si = 0.005–1$$
$$R/Si = 0.1–1.5$$
$$S/Si = 0.1–1$$
$$H_2O/S = 100–1000$$
$$H_2O/Si = 20–200$$
$$OH^-/Si = 0.1–0.4$$

(i) autoclaving the resultant mixture at 20–160° C. for 15 minutes to 5 days (j) subjecting the autoclaved solid to cooling, washing and calcination.

7. A process according to claim 6, wherein the crystals that are obtained after autoclaving (b) are smaller than 150 nm in size.

8. A process according to claim 6, wherein structuring agent R is selected from the group consisting of tetra-alkylammonium hydroxides, quinuclidine, cyclic amine salts, cyclic and aliphatic amines, and alcohols.

9. A process according to claim 8, wherein the structuring agent R is tetraethylammonium hydroxide.

10. A composition comprising a solid according to claim 1 and at least one matrix.

11. A composition according to claim 10, wherein the matrix is selected from the group consisting of alumina, silica, magnesia, titanium oxide, zirconia, aluminum phosphates, titanium phosphates, zirconium phosphates, clays, and boron oxide.

12. A composition according to claim 10, further comprising at least one catalytic element.

13. A composition according to claim 12, wherein the catalytic element is selected from the group consisting of non-noble elements of group VIII and the elements of group VIB.

14. A composition according to claim 10 that also contains phosphorus.

15. In a process comprising converting hydrocarbon feedstocks, in contact with a catalyst, the improvement wherein the catalyst is a composition according to claim 10.

16. A process according to claim 15 for hydrocracking.

17. A process according to claim 15 for the conversion of heavy feedstocks.

18. A solid as obtained by the process of claim 6.

* * * * *